United States Patent [19]

Sebo

[11] 4,139,020
[45] Feb. 13, 1979

[54] MODULAR DASH CONTROL VALVE MANIFOLD

[75] Inventor: Milan J. Sebo, Elyria, Ohio

[73] Assignee: The Bendix Corporation, Southfield, Mich.

[21] Appl. No.: 784,222

[22] Filed: Apr. 4, 1977

[51] Int. Cl.² ............................................. F16K 11/04
[52] U.S. Cl. ................................. 137/454.2; 137/355; 137/596; 137/625.27
[58] Field of Search ...................... 137/271, 355, 454.2, 137/596, 596.1, 625.27, 884

[56] References Cited

U.S. PATENT DOCUMENTS

| | | | |
|---|---|---|---|
| 2,940,465 | 6/1960 | Frantz | 137/271 |
| 3,095,244 | 6/1963 | Valentine et al. | 303/9 |
| 3,244,193 | 4/1966 | Loveless | 137/884 X |
| 3,460,614 | 8/1969 | Burgess | 137/596 X |
| 3,760,844 | 9/1973 | Olson | 137/884 |
| 3,841,714 | 10/1974 | Schultz | 303/71 |
| 3,957,079 | 5/1976 | Whiteman | 137/884 X |

FOREIGN PATENT DOCUMENTS

| | | | |
|---|---|---|---|
| 2048525 | 4/1972 | Fed. Rep. of Germany | 137/454.2 |
| 2528873 | 1/1976 | Fed. Rep. of Germany | 137/625.27 |
| 1365201 | 5/1964 | France | 137/625.27 |

Primary Examiner—Gerald A. Michalsky
Attorney, Agent, or Firm—Ken C. Decker; William N. Antonis

[57] ABSTRACT

A modular control valve manifold assembly is designed for installation in the dashboard of a vehicle equipped with air brakes. The manifold houses the valving required to control the air brake system, and includes a base which provides a plurality of bosses which extend from the base. Each of the bosses house a control valve assembly which controls communication to the vehicle air brake system. The valve assemblies are retained in their bosses by a removable retaining ring, so that the valve assemblies may be easily removed from the manifold through the front of the dashboard for servicing. Furthermore, although the manifold may house an indefinite number of valves, only a single inlet and a single exhaust are required. Each of the valve assemblies controls communication between the inlet, the exhaust, and one of several corresponding outlet ports.

6 Claims, 4 Drawing Figures

U.S. Patent     Feb. 13, 1979     4,139,020
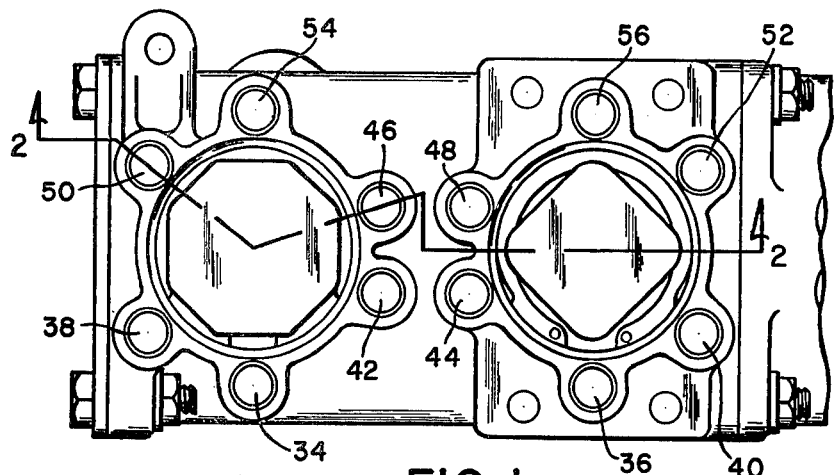
FIG. 1
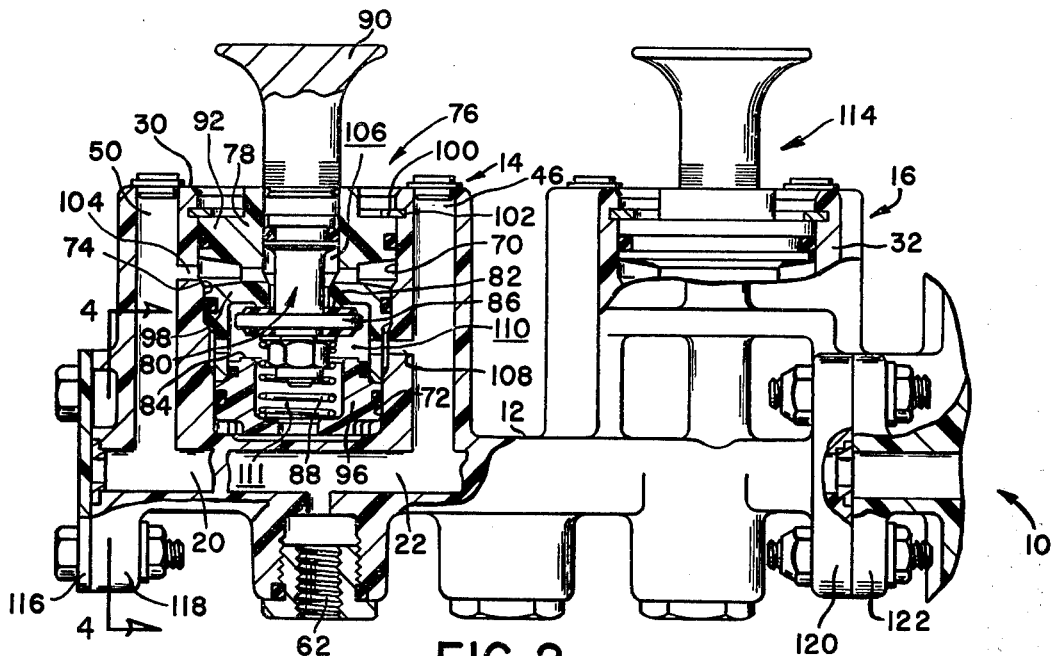
FIG. 2
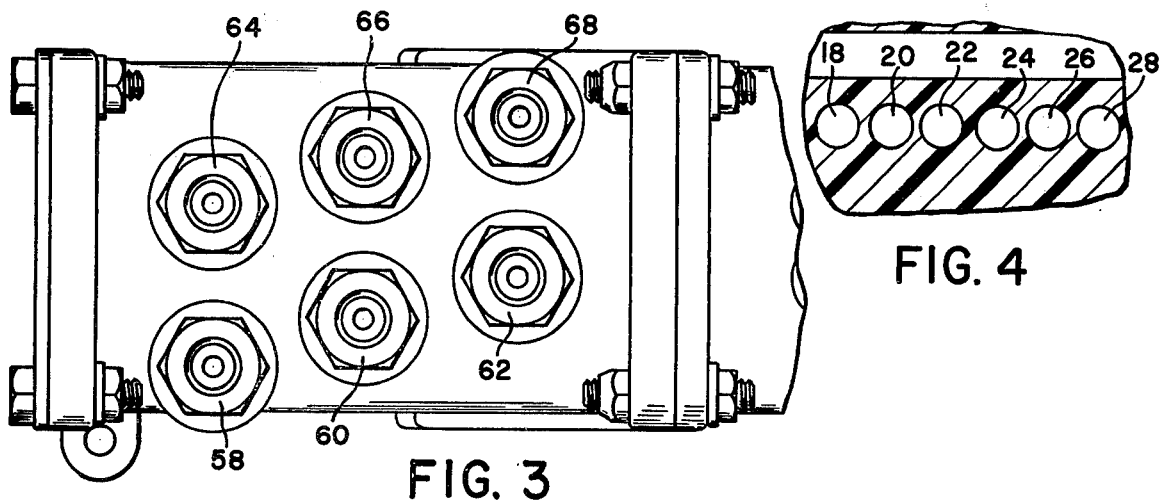
FIG. 3
FIG. 4

MODULAR DASH CONTROL VALVE MANIFOLD

BACKGROUND OF THE INVENTION

This invention relates to a modular control valve assembly for a vehicle air brake system.

Vehicle air brake systems have recently became more sophisticated than prior art systems and require additional valves to control communication between the various parts of the braking system. These valves have traditionally been mounted separately in the vehicle dashboard, and the entire valve assembly heretofore had to be disconnected from the air brake system and removed for periodic maintenance. Furthermore, each of the control valves mounted in the vehicle dashboard has their own inlet, outlet, and exhaust ports. Consequently, many difficult connections to the air brake system had to be made within the vehicle dashboard, thereby complicating installation and servicing problems.

SUMMARY OF THE INVENTION

A modular control valve assembly includes a base which carries a plurality of bosses extending therefrom. Each of the bosses receives a removable valve assembly, consisting of a valve spool carrying valve seats and a movable valve element. The valve assembly is held within the boss by a retaining ring, so that the entire valve assembly may be easily removed from the boss when it requires servicing. Parallel passages extend through the base, and circumferentially spaced passages associated with each of the bosses communicate with a corresponding one of the passages in the base, so that a single inlet communication is provided to communicate air pressure to each of the valves in the assembly, a single exhaust exhausts air from all of the valves of the manifold assembly, and one or more outlet ports may be provided which communicate with one or more of the valves in the assembly and which are connected with the various air brake system components.

Therefore, an important object of my invention is to facilitate assembly of a vehicle air brake control system by providing a modular control valve manifold in which only a single inlet and exhaust connection need be made to service an indefinite number of control valves.

Another important object of my invention is to provide a modular control valve manifold which houses an indefinite number of valves, and to facilitate servicing of these valves by enabling their removal through the front of the dashboard by the release of a single retaining ring associated with each of the valves.

Another important object of my invention is to eliminate leak points in the air brake system by providing a modular valve manifold which requires only a single inlet and a single exhaust connection.

Still another important object of my invention is to enable the air brake control valves used in an air brake vehicle to be serviced without disconnecting the air lines communicating with the valves.

DESCRIPTION OF THE DRAWINGS

FIG. 1 is a fragmentary, top plan view of a modular control valve assembly made pursuant to the teachings of my present invention;

FIG. 2 is a fragmentary view, partly in section, taken substantially along lines 2—2 of FIG. 1;

FIG. 3 is a fragmentary, plan view of the bottom of the assembly illustrated in FIGS. 1 and 2; and FIG. 4 is a fragmentary, cross-sectional view taken substantially along lines 4—4 of FIG. 2.

DETAILED DESCRIPTION

Referring now to the drawings, a modular control valve assembly generally indicated by the numeral 10 includes a base 12 having bosses 14, 16 extending therefrom. Although two bosses are illustrated in the drawings, the invention anticipates that the base 12 may be made of an indefinite length, and that any desired number of bosses, depending upon the functional requirements of the air brake system, may be provided. Elongated, substantially parallel passages 18, 20, 22, 24, 26, and 28 extend axially through the base 12. The bosses 14 and 16 includes circumferentially extending walls 30, 32. The walls 30 and 32 define passages which extend parallel to the axis of the boss and which communicate with the passages 18-28 which extend through the base 12. For example, the passage 34 on the boss 14 and the passage 36 on the boss 16 each communicate with the passage 28. Similarly, passages 38 and 40 communicate with the passage 26; passages 42 and 44 communicate with the passage 24; passages 46, 48 communicate with the passage 22; passages 50, 52 communicate with the passage 20; and passages 54, 56 communicate with the passage 18. Of course, additional bosses may be included as part of the manifold assembly and would be provided with circumferentially spaced passages extending through the wall thereof which would communicate with each of the passages 18-28. The bottom of the assembly 10 is provided with ports 58, 60, 62, 64, 66 and 68 which communicate with the passages 18-28 respectively.

The inner circumferential surface of the wall 30 of the boss 14 is stepped to define a larger diameter portion 70, a smaller diameter portion 72, and a portion 74 of intermedite diameter. As discussed hereinabove, the boss 14 receives a valve assembly, generally indicated by the numeral 76, which includes a spool 78 and a movable valve element 80. The valve spool 78 defines a pair of valve seats 82, 84. The valve element 80 includes a member 86 which is urged into sealing engagement with the valve seat 82 by a spring 88. However, the valve member 86 may be moved into sealing engagement with the valve seat 84 by operation of the handle 90 by the vehicle operator. The valve spool 78 includes a larger diameter portion 92 carrying an O-ring seal which seals with the larger diameter portion 70 of the boss 14, a smaller diameter portion 96 carrying an O-ring seal which seals against the smaller diameter portion 72 of the boss 14, and a portion 98 of intermediate diameter carrying an O-ring seal that sealingly engages the portion 74 of the bore 14. A retaining ring 100 of conventional construction is located in a groove 102 in the wall 30 of the boss 14, and retains the valve assembly 76 in the position illustrated in the drawing. Consequently, the valve assembly 76 may be removed by removal of the retaining ring 100, so that the valve assembly 76 may be serviced.

The inner circumferential surface of the wall 30 is drilled to define a conduit 104 which communicates the passage 50 with a compartment 106 defined above the valve seat 82 in the valve spool 78. Similarly, the inner circumferential surface of the wall 30 is also drilled to define a conduit 108 which communicates the passage 46 with the compartment 110 which is defined between the valve seat 82 and the valve seat 84. As discussed hereinabove, the passage 42 communicates with the passage 24 which in turn communicates with the port 64, so that the port 64 serves as the exhaust port and is communicated to the ambient atmosphere. Similarly, the passage 50 communicates with the passage 20 which in turn communicates with the port 60, so this port serves as the supply port and is connected to a fluid pressure source. The passage 46 communicates with the passage 22 which in turn is communicated with the port 62, so the port 62 serves as the delivery port and is connected to the air brake system component which is controlled by the valve assembly 76. As explained hereinabove, the conduit drilled in the wall 32 of the boss 16 corresponding to the conduit 108 in the boss 14 is communicated to one of the passages 56, 40 or 36. Assuming that this conduit would communicate to the passage 36 which in turn is communicated to the port 68, the valve assembly generally indicated by the numeral 114 which is received in the boss 16 may be used to control communication to the delivery port 68, which is connected to still another component in the air brake system. A removable cover member 116 sealingly engages the end 118 of the modular assembly 10, and seals the ends of the passages 18-28. A similar cover member (not shown) may be used to cover the right-hand end 120 viewing FIG. 2 of the assembly 10, or an additional module generally indicated by the numeral 122 may be attached to the end 120, to provide additional valving capability.

MODE OF OPERATION

Referring now to the valve assembly 76, in the condition illustrated in the drawing, the valve element 80 is sealingly engaged with the valve seat 82, thereby trapping supply pressure communicated through the supply port 60 and the passages 50 and 20. Since the valve element 80 is disposed out of engagement with the valve seat 84, substantially uninhibited communication is permitted between the chambers 110 and 111, thereby communicating the delivery port 62 with the exhaust port 64. When fluid pressure is to be communicated to the aforementioned component connected to the delivery port 62, the vehicle operator manipulates the handle 90 to bring the valve element 80 into sealing engagement with the valve seat 84, thereby terminating communication through the exhaust port 64 and initiating communication between the chambers 110 and 106 so that communication is initiated between the supply port 60 and the delivery port 62. The valve assembly 114 operates in an analagous fashion, except that it controls communication between the supply port 60 and the delivery port 68. As discussed hereinabove, the valve assemblies 76 and 114 may be serviced by removing the retaining ring 100 in the case of the valve assembly 76 and the corresponding retaining ring in the case of the valve assembly 114, whereupon the valve assemblies, consisting of the spool of the movable valve element, may be removed through the open end of their corresponding bosses. Since the appropriate O-ring seals are carried by the valve spool, these seals are removed simultaneously with the removal of the valve assemblies so that the seals may be replaced, and the various valve assemblies may be otherwise serviced when this is required.

I claim:

1. In a modular control valve assembly, a base having an inlet for connection with a fluid pressure source and an outlet, first passage means within said base communicating with said inlet, a boss projecting from said base, said boss including a wall defining a bore within said boss, said bore having an open end facing away from said base, a valve assembly received within said bore, means for locking said valve means in said bore so that said valve assembly may be removed through the open end of said bore upon release of said locking means, second passage means extending through the wall of said boss to communicate said valve assembly with said first passage means so that said valve assembly controls communication between said inlet and outlet, said first passage means including a first portion extending through said base and a second portion defined within the wall of the boss, said second passage means including a first section extending through said base and a second section defined within the wall of said boss, said second portion and said second section each extending substantially parallel to the axis of said bore and being spaced circumferentially from each other around said bore, said first portion of said first passage means and said first section of said second passage means being coplanar and parallel with one another, said first portion intersecting said second portion and said first section intersecting said second section at the end of said boss where the latter joins the base, and a pair of axially spaced conduits extending through the wall of said bore to communicate the latter with said second portion and said second section respectively, said valve assembly controlling communication between said axially spaced conduits.

2. The invention of claim 1:
said valve assembly including a valve spool received in said bore and defining valve seats, sealing means carried by said spool and sealingly engaging the wall of said bore to prevent fluid communication across said seats in the interface between the spool and the bore, said means for locking said valve means in said bore engaging said spool and the wall of said bore.

3. The invention of claim 2:
said valve assembly including a movable valve element carried by said spool and movable relative thereto to cooperate with said seats to control communication between said first and second passage means.

4. In a modular control valve assembly, a base having an inlet for connection with a fluid pressure source and an outlet, first passage means within said base communicating with said inlet, a boss projecting from said base, said boss including a wall defining a bore within said boss, said bore having an open end facing away from said base, a valve assembly received within said bore, means for locking said valve means in said bore so that said valve assembly may be removed through the open end of said bore upon release of said locking means, second passage means extending through the wall of said boss to communicate said valve assembly with said first passage means so that said valve assembly controls communication between said inlet and outlet, said valve assembly having a valve spool, and a movable valve element carried within said spool, said spool including a housing having a circumferentially extending outer wall defining a chamber therewithin and a pair of axially spaced valve seats carried by said outer wall and disposed within said chamber, said bore receiving said valve spool, said valve seats being integral with said outer wall so that the valve spool including said valve seats can be removed from said bore as a unit, said movable valve element including a portion disposed between said seats and engageable with both of the latter to control fluid communication thereacross and being engageable with said seats so that the movable valve member is removed with the spool when the latter is removed from the bore, and circumferentially extending sealing means on the outer circumferential surface of said outer wall sealingly engaging the wall of said bore when the valve spool is installed therein, said locking means including releasable means carried at the open end of said bore and engaging the end of said valve spool disposed adjacent the open end of said bore when the valve spool is installed in said bore.

5. The invention of claim 4, wherein said bore and the outer circumferential surface of the wall of said valve spool are stepped complementary to one another to define a larger diameter portion adjacent the open end of said bore, a smaller diameter portion disposed adjacent the opposite end of said bore, and a portion of intermediate diameter between the larger and smaller diameter portions, said sealing means including circumferentially extending seals on the larger, smaller and intermediate portions of the wall of said valve spool, and a pair of axially spaced conduits extending through the wall of said bore and the wall of said valve spool to communicate said first and second passage means into the chamber defined with said valve spool, said seals cooperating with said bore and with said outer circumferential surface of the wall to seal said conduits from one another.

6. The invention of claim 4, wherein the outer wall defining said valve spool has one end adjacent the open end of said bore when the valve spool is installed therein, and said locking means includes a groove circumscribing the wall of said bore and a retaining ring disposed in said groove but projecting radially therefrom to engage said one end of the outer wall of the valve spool.

* * * * *